(12) United States Patent
Watson et al.

(10) Patent No.: US 11,102,302 B2
(45) Date of Patent: Aug. 24, 2021

(54) CONVERSION OF AIRCRAFT DATA OVER WIRELESS NETWORKS FOR FLIGHT DECK AND CABIN AIRLINE APPLICATIONS

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 43 days.

(21) Appl. No.: 16/458,415

(22) Filed: Jul. 1, 2019

(65) Prior Publication Data

US 2019/0327307 A1 Oct. 24, 2019

Related U.S. Application Data (63) Continuation of application No. 15/199,525, filed on Jun. 30, 2016, now Pat. No. 10,382,557.

(51) Int. Cl.
*H04L 29/08* (2006.01)
*H04W 4/70* (2018.01)
(Continued)

(52) U.S. Cl.
CPC ......... *H04L 67/12* (2013.01); *H04B 7/18508* (2013.01); *H04L 12/403* (2013.01);
(Continued)

(58) Field of Classification Search
CPC ........ H04L 12/403; H04L 67/12; H04W 4/70; H04W 28/0215; H04B 7/18508
See application file for complete search history.

(56) References Cited

U.S. PATENT DOCUMENTS 9,203,895 B1 * 12/2015 Sauer ...................... H04L 69/08
10,382,557 B2 8/2019 Watson et al.
(Continued)

FOREIGN PATENT DOCUMENTS

| CN | 101913427 A | 12/2010 |
|---|---|---|
| CN | 102523632 A | 6/2012 |

(Continued)

OTHER PUBLICATIONS

UTC Aerospace Systems, Aircraft Interface Device (AID) (Brochure), Jun. 2015, 2 pages, Burnsville, MN, USA.
(Continued)

*Primary Examiner* — Rhonda L Murphy
(74) *Attorney, Agent, or Firm* — Perkins Coie LLP (57) ABSTRACT

An in-flight entertainment and communications (IFEC) system is configured to interconnect an avionics data bus to a local area network. An avionics interface is connectable to the avionics data bus, and receptive to avionics data transmitted on the avionics data bus by one or more avionics nodes over a predetermined protocol. A local network interface establishes the local area network, and portable electronic devices may be connectable to the local network interface over the local area network to establish a data communications link thereon. A data processor is connected to the avionics interface and the local network interface, and relays the avionics data from the avionics interface to the local network interface for transmission to the one or more portable electronics devices. This transmission is according to the predetermined protocol over the data communications link established on the local area network.

19 Claims, 4 Drawing Sheets

(51) Int. Cl.

| | | |
|---|---|---|
| *H04B 7/185* | (2006.01) | |
| *H04L 12/403* | (2006.01) | |
| *H04L 29/06* | (2006.01) | |
| *H04W 28/02* | (2009.01) | |
| *H04L 12/40* | (2006.01) | |
| *H04W 84/12* | (2009.01) | |

(52) U.S. Cl.
CPC ...... *H04L 63/0227* (2013.01); *H04L 63/1425* (2013.01); *H04W 4/70* (2018.02); *H04W 28/0215* (2013.01); *H04L 2012/4028* (2013.01); *H04W 84/12* (2013.01)

(56) References Cited

U.S. PATENT DOCUMENTS

| | | | |
|---|---|---|---|
| 2013/0066487 A1* | 3/2013 | Holder | G08G 5/0021 701/14 |
| 2014/0074322 A1 | 3/2014 | Baumgarten et al. | |
| 2016/0019793 A1 | 1/2016 | Fournier et al. | |
| 2016/0373184 A1 | 12/2016 | Oder et al. | |
| 2019/0251051 A1* | 8/2019 | Warner | G06F 1/266 |

FOREIGN PATENT DOCUMENTS

| | | |
|---|---|---|
| CN | 102761466 A | 10/2012 |
| CN | 103200283 A | 7/2013 |
| CN | 103279082 A | 9/2013 |
| CN | 105679101 A | 6/2016 |
| EP | 2945060 A2 | 11/2015 |
| WO | 2015001112 A1 | 1/2015 |

OTHER PUBLICATIONS

Aircraft Technology, Tablets and the Future of EFBs, 36-43 page (8 pages), Issue 127, origin.misc.pagesuite.com/.../21754add-5183-4519-9864-36bedf17f2a0.pdf.
Thales, Thales Pad (Brochure), 2 pages, 2014.
Avionics, Databus Testing: Balancing Cost and Throughput, Sep. 1, 214, 5 pages, http://www.aviationtoday.com/av/issue/feature/Databus-Testing-Balancing-Cost-and-Througput_82841.html.
Chris Riley, Airborne Network Security Simulator (ANSS) Master Plan Overview (Power Point Presentation), Nov. 3, 2010, 16 pages, John A. Volpe National Transformation Systems Center US Department of Transportation Research and Innovative Technology Adminstration (RITA).
Search Report from Chinese application No. CN201710507396.2 dated Dec. 21, 2020.

* cited by examiner

CONVERSION OF AIRCRAFT DATA OVER WIRELESS NETWORKS FOR FLIGHT DECK AND CABIN AIRLINE APPLICATIONS

CROSS-REFERENCE TO RELATED APPLICATIONS

The application is a continuation patent application of U.S. patent application Ser. No. 15/199,525 and entitled "CONVERSION OF AIRCRAFT DATA OVER WIRELESS NETWORKS FOR FLIGHT DECK AND CABIN AIRLINE APPLICATIONS," the entire contents of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to communications systems, including those for use by crew members of passenger vehicles. More particularly, the present disclosure relates to the conversion of aircraft data over wireless networks for flight deck and cabin airline applications.

2. Related Art

The piloting of aircraft, in particular those carrying passengers, is highly technical and demanding, and strict adherence to established procedures is critical to maintaining safety. The aircraft crew, from pilots to cabin personnel, typically refers to a significant volume of information during flight operations. Such information includes aircraft operating manuals, navigational and aeronautical charts, route manuals, logbooks, aircraft operating procedure checklists, weather reports, and the like. Traditionally, these documents have been carried by pilots in flight bags, which are also used to carry other miscellaneous documents such as airline and aircraft operating credentials, government licenses, medical certificates, and so on.

All of the aforementioned documents may constitute over tens of thousands of pages and weigh over fifty pounds. Although this weight may appear insignificant, particularly when considered at the individual aircraft and/or flight level, over an entire fleet of aircraft, the elimination of paper can lead to significant weight reductions. This weight reduction, in turn, can lead to substantial fuel savings. Indeed, by some accounts, large airlines can reduce fuel consumption by 300,000 to 400,000 gallons, saving airlines over $1 million.

The need for ready access to the aforementioned information remains, and so the paper reduction/elimination efforts contemplate migrating the information to so-called electronic flight bags (EFBs). Generally, EFBs are portable computing devices utilized by aircrew and fall into one of three classes: Class 1, which are basic portable electronic devices such as tablets and laptop computers that must be stowed during takeoff and landing, much like passenger portable electronic devices (PEDs); Class 2, which are devices that can be docked to aircraft structure and be used during all phases of the flight; and Class 3, which are devices that are fully integrated into the onboard avionics systems and certified by the Federal Aviation Administration (FAA) via a supplemental type certificate.

Paper elimination efforts from aircraft involve loading the EFBs with the electronic versions of the aforementioned documents. Additionally, EFBs may incorporate various flight-specific applications that provide a greater degree of interactivity in accessing information specific to flight operations. Standard document viewing applications capable of viewing PDFs, HTML, and XML files are referred to as Type A applications, while interactive aeronautical chart applications, flight checklist applications, and so on are referred to as Type B applications. Some applications, referred to as Type C applications, can interface directly with the avionics systems of the aircraft and display updated information therefrom. Additionally, the information reported from the aircraft systems such as fault codes can be recorded in electronic log book applications that are accessible by in-flight crew as well as the ground crew in real time prior to landing.

Presently, connecting to the avionics system with Type C applications require a device known in the art as an Aircraft Interface Device (AID) in accordance with the industry standard ARINC 759. The AID converts the data from the legacy onboard avionics equipment to a standardized format, and transmits the data to a receiving device via a wired Ethernet connection. As conventional tablet devices typically do not include Ethernet ports, they must be retrofitted with Ethernet modules, or utilize still another connectivity module that wirelessly broadcasts the data received via the Ethernet connection. One known solution utilizes a Bluetooth™ transceiver to transmit the avionics data to the EFB/tablet, but this still requires the AID.

As can be appreciated from the efforts to eliminate paper from the aircraft, the weight of each installed component on a given aircraft has a significant impact on fuel consumption, and hence airline profitability. Accordingly, there is a need in the art for eliminating separate hardware devices, the functions of which may already be provided in some form by existing aircraft systems. There is a need for systems and methods for converting aircraft data over wireless networks for flight deck and cabin airline applications.

BRIEF SUMMARY

According to various aspects of the present disclosure, existing installed equipment such as the in-flight entertainment and communications (IFEC) system or other connectivity server, along with at least one wireless access point, may be used to provide data from different avionics systems to electronic flight bags (EFBs). The contemplated system is understood to eliminate one or more hardware components including conventional aircraft interface devices (AIDs) that would otherwise result in substantial weight burdens. The EFBs and cabin crew issued devices may receive the data over WLAN 802.11 wireless protocols, and due to the availability of wireless coverage throughout the cabin, crew applications running on these devices can work anywhere on the aircraft.

One embodiment is directed to an IFEC system that is configured to interconnect an avionics data bus to a local area network. The IFEC system may include an avionics interface that is connectable to the avionics data bus. Additionally, the avionics interface may be receptive to avionics data transmitted on the avionics data bus by one or more avionics nodes over a predetermined protocol. There may also be a local network interface that establishes the local area network. One or more portable electronic devices may be connectable to the local network interface over the local area network to establish a data communications link thereon. The IFEC system may also include a data processor that is connected to the avionics interface and the local network interface. The data processor may parse the avionics data from a transmission conforming to the predetermined protocol received from the avionics interface, and relays the parsed avionics data to the local network interface for transmission to the one or more portable electronics devices. This transmission may be according to the predetermined protocol over the data communications link established on the local area network.

Another embodiment is directed to a system for interfacing aircraft avionics to mobile computing devices. The system may include an avionics bus interface module that defines a node of an avionics bus, the aircraft avionics being connectable to the avionics bus interface module over the avionics bus to transmit avionics data thereto. The system may also include an avionics sensor interface module that is directly connected to one or more of the aircraft avionics. The avionics sensor interface module may be receptive to a sensor signal output by the aircraft avionics. There may additionally be a network interface that defines a node of a local area network. One or more computing devices may be connectible to the network interface over the local area network. The system may further include a network access controller. The data elements of the avionics data received from the avionics bus interface module and the data elements of the avionics sensor data received from the avionics sensor interface module are selectively transmitted by the network interface to the one or more computing devices over the local area network. In an alternate embodiment, the avionics data includes one or more data elements with each assigned a security classification. Corresponding avionics sensor data including one or more data elements may be generated in response, and the one or more data elements may each be assigned a security classification. The data elements of the avionics data received from the avionics bus interface module and the data elements of the avionics sensor data received from the avionics sensor interface module are selectively transmitted in the alternate embodiment based upon the security classification to which the respective one of the data elements is assigned.

Another embodiment is directed to a non-transitory computer readable medium connected to an in-flight entertainment and communications (IFEC) system that includes instructions executable by the IFEC system corresponding to a method of regulating data traffic between computing devices connected to an onboard local area network and aircraft avionics systems. The method may include receiving avionics data generated by the aircraft avionics system through a first interface to an avionics bus. There may also be a step of selectively relaying, with a network access controller, the received avionics data to a network interface. Additionally, there may be a step of transmitting, from the network interface, the avionics data relayed from the network access controller to one or more of the computing devices. The network interface may establish the onboard local area network to which the one or more of the computing devices are connected. In an alternate embodiment, a step is included of assigning a security classification to each of the data elements, and the step of selectively relaying is based upon the security classification to which the respective one of the data elements is assigned.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of systems for the conversion of aircraft data over wireless networks for flight deck and cabin airline applications. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
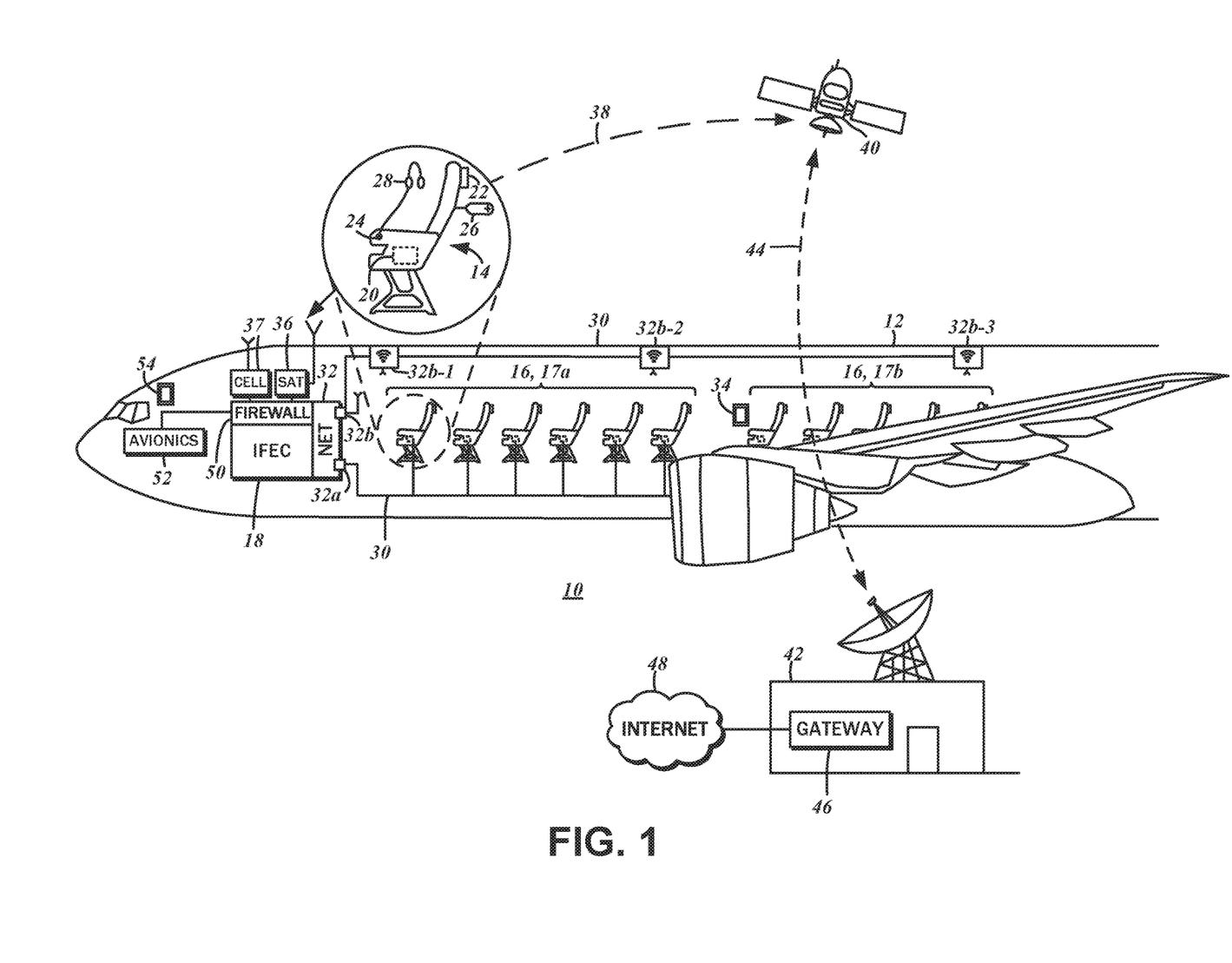
FIG. 1 is a diagram illustrating an environment in which the presently disclosed system for conversion of aircraft data over wireless networks for flight deck and cabin applications may be implemented.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. The cabin may be separated into multiple segments, such as, for example, a first section 17a and a second section 17b. Although the features of the present disclosure will be described in the context of the aircraft 10, this is by way of example only and not of limitation. The presently disclosed system for conversion of data over wireless networks may be utilized in any other context as appropriate, such as, by way of non-limiting illustrative example, the disclosed system may be used on busses, trains, ships, and other types of vehicles.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen or other type with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including two or three sockets or a standard audio output without noise canceling. In alternate embodiments, each display 22 may incorporate a terminal unit 20 to form a display unit referred to in the art as a smart monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display 22 and the audio output 24, respectively. The multimedia content data files may be stored in one or more repositories associated with the IFEC system 18, and each of the terminal units 20 for each seat 14 may be connected thereto over a local area network 30, one segment of which may preferably be Ethernet. The IFEC system 18 thus includes a data communications module 32, and more specifically, an Ethernet data communications module 32a, e.g., an Ethernet switch or router.

One or more passengers may utilize a portable electronic device (PED) 34 during flight. For purposes of the present disclosure, PEDs 34 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Almost all conventional PEDs 34 have a WLAN (WiFi) module, so the data communications module 32 of the IFEC system 18 includes a WLAN access point 32b. The PED 34, via the onboard WLAN network, may connect to the IFEC system 18 to access various services offered thereon such as content downloading/viewing, shopping, and so forth.

Typically, a single WLAN access point 32b is insufficient for providing wireless connectivity throughout the cabin, so additional WLAN access points 32b-1, 32b-2, and 32b-3 may be installed at various locations spaced apart from each other. By way of example, the WLAN access points 32b and 32b-1 may provide connectivity to the first few rows 16 within the first section 17a, while the WLAN access point 32b-2 provides connectivity to the last few rows 16 within the first section 17a and the first few rows 16 within the second section 17b. Furthermore, the WLAN access point 32b-3 may provide connectivity to the last few rows 16 within the second section 17b. These additional WLAN access points 32b-1, 32-b2, and 32b-3 may be connected to the IFEC system 18 over an Ethernet link that is part of the aforementioned local area network 30. The local area network interface or data communications module 32 is understood to encompass the hardware components such as the WLAN transceiver 32b and the Ethernet router/switch 32a, as well as the software drivers that interface the hardware components to the other software modules of the IFEC system 18.

One of the functions of the IFEC system 18 is to deliver multimedia content data requested by the passenger via the terminal unit 20 or the PED 34. This multimedia content data may include movies, television shows, music, and so forth, and is understood to be stored in a database that is part of the IFEC system 18. Additional software modules are understood to be incorporated into the IFEC system 18, including a streaming server that retrieves the multimedia content from the database for transmission to the requesting terminal unit 20 or the PED 34. There may also be a cataloging/menu application with which the user interacts to select the desired multimedia content. Those having ordinary skill in the art will recognize the additional hardware and software features that may be incorporated into the IFEC system 18 to provide passengers greater utility and entertainment.

The IFEC system 18 may also offer Internet access to the connecting terminal units 20 as well as the PEDs 34. One contemplated modality that operates with the IFEC system 18 is a satellite module 36 that establishes a data uplink 38 to a communications satellite 40. According to one exemplary embodiment, the data uplink 38 may be Ku-band microwave transmissions. However, any suitable communications satellite 40, such as Inmarsat or Iridium may also be utilized without departing from the present disclosure. The data transmitted to the communications satellite 40 is relayed to a satellite communications service provider 42. A data downlink 44 is established between the communications satellite 40 and the satellite communications service provider 42 that, in turn, includes a network gateway 46 with a connection to the Internet 48. In another embodiment, the aircraft 10 can be equipped with a cellular modem 37 instead of, or in addition to the satellite module 36 for remote connectivity.

The terminal unit 20 or the PED 34 is understood to connect to the IFEC system 18 via the local area network 30 established by the data communications module 32, which relays the data transmissions to the satellite module 36. The data is transmitted to the communications satellite 40 over the data uplink 38, and the communications satellite 40 relays the data to the satellite communications service provider 42 over the data downlink 44. The network gateway 46 then routes the transmission to the Internet 48. Due to the high costs associated with the communications satellite 40 that is passed to the users of the data uplink 38 and the data downlink 44, carriers may limit data traffic to and from the satellite module 36 with a firewall 50, also referred to herein as a network access controller.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

The aircraft 10 is comprised of multiple independent systems, and the IFEC system 18 discussed above is one such independent system. Separate from the IFEC system 18 is the avionics system 52, which is understood to encompass the electronics system for the flight controls of the aircraft 10, along with communications with air traffic control and airline operations, ground-based and satellite-based navigation systems, flight management/monitoring systems, collision avoidance systems, flight recorders, and weather systems.

In addition to the passengers bringing the PEDs 34 on board for entertainment or productivity use, flight crew and cabin crew may likewise employ computing devices to carry out their respective duties during flight. For instance, the flight crew may utilize an electronic flight bag (EFB) 54 to access aircraft operating procedure documentation, updated government agency bulletins such as FAA Advisory Circulars (ACs) and flight path or airport specific Notices to Airmen (NOTAMs), and other static, non-interactive copies of paper documents. The applications used for viewing these documents may be referred to as Type A software. Static or dynamic navigation charts and other flight-critical information, as well as interactive flight planning/management applications, referred to as Type B software. Further, EFBs may be loaded with Type C software that interface directly with the avionics systems 52. The cabin crew may be issued a PED 34 that is loaded with specific applications for managing cabin operations that may utilize information from the avionics systems 52. Henceforth, the flight crew electronic flight bag and the cabin crew-issued personal electronic device 34 will be generally referenced as the EFB 54, unless specific distinctions between the flight crew device and the cabin crew device are being illustrated.

The present disclosure contemplates a configuration of the IFEC system 18 in which the avionics systems 52 are interconnected to the EFB 54 over the local area network 30. Preferably, though optionally, the EFBs 54 contemplated for use with the embodiments of the present disclosure are Class 2 devices, that is, portable computing devices that may be mounted to the internal structure of the aircraft 10 for use throughout all phases of flight.

Figure 2:
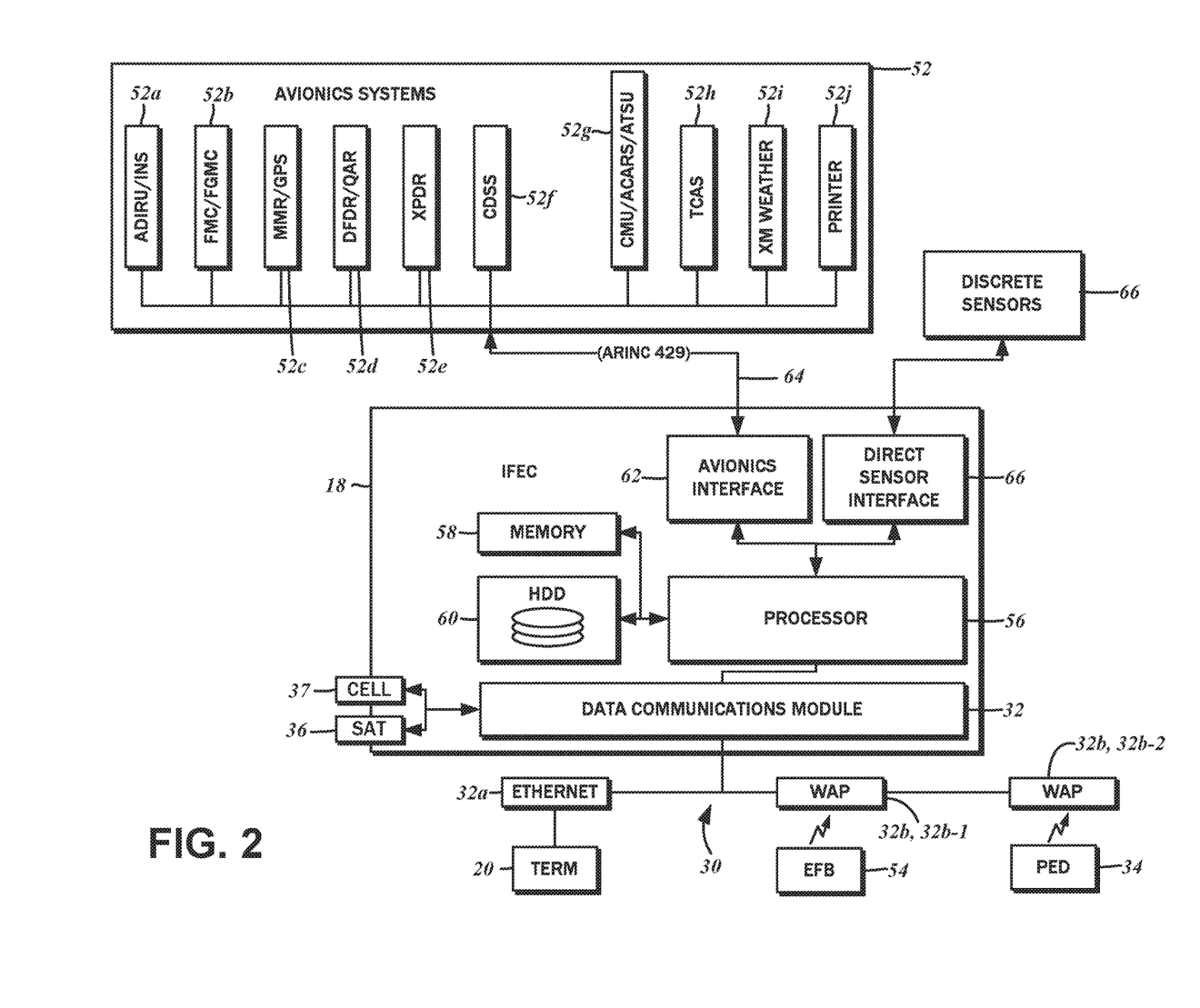
FIG. 2 is a block diagram of exemplary in-flight entertainment and communications (IFEC) computer system configured to interconnect an aircraft avionics data bus to a local area network.

Referring to the block diagram of FIG. 2, additional details of the hardware components of the IFEC system 18 that may be utilized in connection the system for the conversion of aircraft data over wireless networks for flight deck and cabin airline applications are illustrated. In general, the IFEC system 18 is a computer or data processing device that executes pre-programmed instructions to generate outputs in response to inputs. Accordingly, there is a processor 56, as well as a memory 58 in which such instructions are stored. As indicated above, the IFEC system 18 streams multimedia content to the terminal units 20, and so the multimedia content data may be stored on a hard disk drive 60 or other permanent storage device such as solid state drives, optical drives, and so forth. The hard disk drive 60 may also be utilized for storing data aircraft data as received from the avionics systems 52. Alternatively, the IFEC system 18 may be connected to a separate network storage server over the local area network 30, in which case a directly installed hard disk drive 60 may not be needed.

The processor 56 manages the operation of the data communications module 32 which includes the Ethernet data communications module 32*a* and one or more WLAN access points 32*b* that can communicate wirelessly with the EFB 54 and the cabin crew-issued PED 34. The block diagram of FIG. 2 illustrates the first WLAN access point 32*b*-1 connected to the EFB 54 and the second WLAN access point 32*b*-2 connected to the cabin crew-issued PED 34, though this is by way of example only. Those having ordinary skill in the art will recognize that as long as either end device remains within communication range to any segment of the wireless network, whether principally connected through the first WLAN access point 32*b*-1 or through the second WLAN access point 32*b*-2, the device is deemed to be connected to the local area network 30. Additional upstream network links established by the satellite module 36 and the cellular modem 37 are also understood be part of the local area network 30, and connected via the Ethernet data communications module 32*a*.

Running on the IFEC system 18 may be a server application that utilizes the data communications link established between the EFB 54 and the IFEC system 18 over the local area network 30 to transmit and receive various data over a predetermined protocol. In this regard, the EFB 54 or the cabin crew-issued PED 34 is understood to be a client node that generates requests or commands to the server that is the IFEC system 18, to which the IFEC system 18 responds with data that is the subject of the request.

The IFEC system 18 contemplated in accordance with the present disclosure also includes an avionics interface 62 that is connectible to the avionics systems 52 over an avionics data bus 64. As shown in FIG. 2 and considered herein, the avionics systems 52 collectively refers to a plurality of avionics systems utilized in the aircraft 10 that are specific to the various functional features thereof. These different systems are understood to output certain data, and are receptive to certain data/commands from external sources.

One such system is an Air Data Inertial Reference Unit (ADIRU)/Inertial Navigation System (INS) 52*a* that outputs fundamental flight dynamic information including airspeed, angle of attack, altitude, position, and attitude. It is understood that this data is generated by a component known in the art as an air data module (ADM) that converts the electronic sensor measurements from a Pitot tube or static port.

Another avionics system is a Flight Management Computer (FMC)/Flight Guidance Management Computer (FGMC) 52*b*. The FMC/FGMC 52*b* performs in-flight management of the flight plan, and utilizes various other avionics systems to ascertain position to provide guidance to the aircraft 10 to conform to the flight plan. A typical flight plan is developed from information in a navigation database, including origin and destination airports and runways, waypoints/intersections, airways, radio navigation aids along the flight path, standard instrument departure procedures, standard terminal arrival routes, holding patterns, and instrument approach procedures.

Yet another avionics system is a Multi-Mode Receiver (MMR)/Global Positioning System (GPS) 52*c*, which integrates receivers for various terrestrial navigation systems and the satellite-based GPS route navigation system. Among the typical terrestrial radio navigation systems are the instrumental landing system (ILS), microwave landing system (MLS), and VHF omnidirectional range (VOR)/Distance Measuring Equipment (DME). In addition to route navigation, it is understood that GPS may be utilized for landing navigation, e.g., GLS (GPS Landing System).

The avionics systems 52 also includes a Digital Flight Data Recorder (DFDR)/Quick Access Recorder (QAR) 52*d*, which are used to record all detectable aircraft parameters and control inputs throughout all phases of flight. This is understood to encompass control and actuator positions, engine information, navigational/position information, and other data from each of the avionics systems 52 that are collected by the Flight Data Acquisition Unit.

The typical aircraft 10 also includes a transponder 52*e*, which transmits identifying information in response to an interrogating signal. The transponder 52*e* is thus an additional avionics system, and operational information therefrom is understood to be reported to the IFEC system 18 for relaying to the EFB 54.

With heightened security requirements in which entry into the flight deck during flight is restricted, a Flight Deck or Cockpit Door Surveillance Systems (CDSS) 52*f* may be installed on commercial aircraft. Those requesting entry on or into the flight deck are monitored with video cameras, the feeds from which are shown in the flight deck and recorded.

Typically, the foregoing avionics systems 52*a*-52*f* only output operational information, and are not configured to receive commands from external sources. Any inputs/commands are limited to those provided from within the context of the avionics system. There are avionics systems 52 that may be configured for bi-directional communications with external sources, however. The present disclosure accordingly envisions the data communications module 32 being bi-directional, and therefore receptive to input data transmitted from the EFB 54.

One such system is a Communications Management Unit (CMU)/Aircraft Communications Addressing and Reporting System (ACARS)/Air Traffic Service Unit (ATSU) 52*g* that enables various messaging features between the aircraft 10 and various ground stations, including air traffic control, aeronautical operational control, and airline administrative control. Information that is needed immediately during flight but are relatively short such as final aircraft load data, weather and NOTAM information, passenger service-related information and so on are suited for delivery via these communications modalities. The messages received by the CMU/ACARS/ATSU 52*g* may be relayed to external sources, and is also receptive to messages generated from external sources for transmission by the CMU/ACARS/ATSU 52*g*.

Another avionics system capable of bi-directional communications with the IFEC system 18 is a Traffic Alert and Collision Avoidance System (TCAS) 52*h*, which monitors the surrounding airspace for other aircraft to reduce mid-air collisions. The TCAS 52*h* serves alert and advisory functions that operates by scanning for corresponding transponders on nearby aircraft and instructing the conflicting aircraft toward directions that do not conflict.

Bi-directional communications with the IFEC system 18 is also contemplated for a satellite weather system 52*i*, which provides interactive graphical weather updates in the form of radar images, satellite images, lightning alerts, METAR weather reports, freezing levels, and so forth. Via the onboard unit, the pilot can interact with the display to retrieve selected weather information for the current or other locations. The same queries can be generated from the EFB 54 for displaying the information thereon.

Notwithstanding the efforts towards paperless flight decks, the information from the various avionics systems 52 may be best presented and shared amongst the flight crew via paper copies generated by an on-board printer 52*j*. The communications between the printer 52*j* and the IFEC system 18 may be bidirectional so that print jobs can be sent from the initiating EFB 54, and status updates can be sent in response thereto.

The description of the various avionics systems 52*a*-52*j* is understood to be by way of example only and not of limitation. The IFEC system 18 need not be connected to each and every one, and other avionics systems not expressly mentioned herein may be connected to the IFEC system 18. Those having ordinary skill in the art will recognize the types of data that may be communicated between such avionics systems 52 and the EFB 54.

According to various embodiments of the present disclosure, each of the aforementioned avionics systems 52*a*-52*j* may have a physical and electrical interface conforming to the ARINC 429 standard. In accordance therewith, the avionics data bus 64 is a two-wire twisted pair electrical connection with balanced differential signaling. Those having ordinary skill in the art will recognize the port configuration requirements as well as the datagram structures for conformity to the standard, and will be omitted for the sake of brevity. The use of ARINC 429 is by way of example only, however, and so the avionics data bus 64 may implement other connectivity standards such as RS-232, RS-422, ARINC-717, and so forth. The higher level data exchange protocols implemented by the avionics systems 52 may be defined in accordance with ARINC 834, and may include GAPS (Generic Aircraft Parameter Service) that is based on the Simple Network Management Protocol (SNMP), STAP (Simple Text Avionics Protocol), and ADBP (Avionics Data Broadcast Protocol) that utilizes eXtensible Markup Language (XML)-based messaging. Once avionics data is received by the processor 56, it may be stored temporarily in the memory 58 before transmission to the EFB 54.

In addition to the avionics systems 52 connected to the IFEC system 18 via the avionics data bus 64, the connection of discrete sensors 66 of the aircraft 10 such as weight on wheels sensors, door sensors, engine start lever sensors, brake sensors, and the like. Furthermore, the location identifier may likewise be directly reported to the IFEC system 18. Accordingly, the IFEC system 18 may include a direct sensor interface 68 that is connectible to the discrete sensors 66, and is receptive to the sensor signals generated thereby. In some cases, the sensor signals may be analog with different levels representing different conditions. The direct sensor interface 68 thus quantizes the signal into digital numerical values. Alternatively, the sensor signals may already be in digital form. The direct sensor interface 68 is also connected to and controlled by the processor 56, with the processor 56 generating sensor data objects that are representative of the sensor signals.

Still referring to the block diagram of FIG. 2, the processor 56 is connected to the avionics interface 62, and as indicated above, to the data communications module 32. The processor 56 parses the avionics data which may be structured in accordance with the aforementioned ARINC 834 protocol as received by the avionics interface 62. This data may, in turn, be relayed to the data communications module 32, also referred to as the local network interface, for transmission to the EFB 54. These end devices are understood to be configured for handling messages structured according to the predetermined protocol, e.g., the ARINC 834 protocol. It is thus expressly contemplated that no further translation or processing of the messages as received by the avionics interface 62 is necessary prior to transmission to the EFB 54, as only the transport modality has changed, e.g., to WLAN/802.11. The data directly derived from the discrete sensors 66 may be similarly structured in accordance with the ARINC 834 protocol.

In the case of any communications originating from the EFB 54 to the avionics systems 52, the same is true. The messages are generated in accordance with the ARINC 834 protocol, and transported to the IFEC system 18 over the local area network 30. The processor 56 parses the messages, and routes the same to the designated node or nodes of the avionics systems 52 over the avionics data bus 64.

Figure 3:
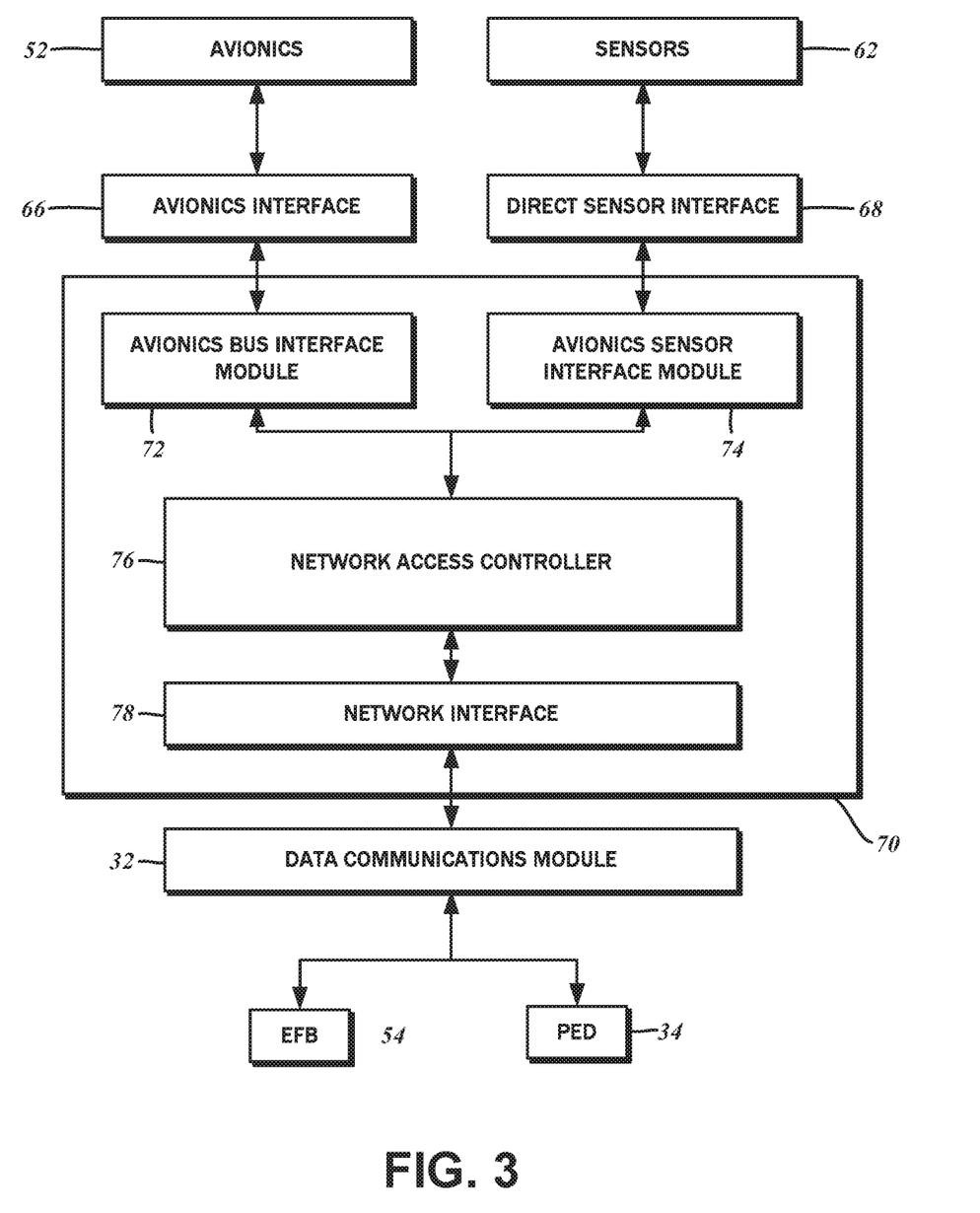
FIG. 3 is a block diagram of a system for interfacing avionics to computing devices in accordance with another embodiment of the present disclosure.

Having considered an embodiment of the IFEC system 18 and its hardware components in which the avionics systems 52 are interconnected to the local area network 30 and the various computing devices such as the EFB 54 connected thereto, a further embodiment of a system 70 for interfacing aircraft avionics to computing devices will be described with reference to the block diagram of FIG. 3. In one implementation, the system 70 may be implemented as a series of software modules, though this is by way of example only and not of limitation.

The system 70 includes an avionics bus interface module 72 that logically defines a node of the avionics data bus 64. The avionics bus interface module 72 manages and controls the operation of the hardware counterpart that is the aforementioned avionics interface 62, which is connected to the various avionics systems 52 as described above. In the exemplary embodiment, the remote nodes of the avionics systems 52, e.g., the data sources, implement the higher level data exchange protocols as defined under the ARINC-429 standard. The avionics bus interface module 72, then, is understood to likewise implement the data exchange protocols of the ARINC-429 standard so that its data frame/message contents can remain intact. The avionics data generated by these avionics systems 52 are understood to be comprised of multiple data elements, with each data element being assigned a security classification.

As referenced herein, the assignment of the security classification may be on a data element-by-data element basis, that is, each data element being comprised of two fields—one with the data element itself, and the other with the security classification that is assigned to the data element. The classification system may be as simple as secured or unsecured, or based upon a spectrum of data sensitivity. For instance, weather data may not be as sensitive as aircraft positon data.

Alternatively, however, this security classification may be a policy that is implemented by a network access controller 76 that treats all avionics data relayed thereto by the avionics bus interface module 72 as restricted and not to be transmitted to devices on the local area network 30 that are not authorized to receive such data, e.g., passenger PEDs 34 as opposed to the EFB 54. With such an implementation, the aforementioned fields are deemed to be unnecessary. These two exemplary implementations are not intended to be limiting, and those having ordinary skill in the art will recognize that a security system that selectively allows and disallows the transmission of the avionics data to select devices connected to the local area network 30.

The system 70 may further include an avionics sensor interface module 74, which manages and controls the operation of the hardware counterpart that is the aforementioned direct sensor interface 68. In the broadest sense, the discrete sensors 66 that are connected to the direct sensor interface 68 are also understood to be avionics, and thus may be referred to as such. The avionics sensor interface module 74 is receptive to the sensor signal output by the aircraft avionics. Corresponding avionics sensor data are generated in response to the sensor signal output by the avionics sensor interface module 74. The avionics sensor data is also understood to be comprised of one or more data elements that have a security classification, though this may be implemented in various ways as described above. The avionics sensor interface module 74 is understood to be an optional component of the system 70, and need not be present in all implementations thereof. That is, the system 70 may function with only the avionics bus interface module 72.

The aforementioned data communications module 32 that is the hardware component that physically establishes the local area network 30 likewise has a software module counterpart of a network interface 78. In further detail, the network interface 78 defines a node of the local area network 30, and as indicated above, one or more computing devices, e.g., passenger PEDs 34 and flight crew EFBs 54, can connect to the network interface 78 over the data communications link established on the local area network 30.

Generally, the network access controller 76 selectively transmits the aforementioned data elements of the avionics data received from the avionics bus interface module 72 and the data elements of the avionics sensor data received from the avionics sensor interface module 74 to the different devices connected to the local area network 30. In this regard, the network access controller 76 corresponds to the aforementioned firewall 50 of the IFEC system 18. The system 70, and in particular the network access controller 76, is not limited to relaying data originating from the avionics systems 52. Upstream network traffic to and from the satellite module 36 and the cellular modem 37 may pass through the network access controller 76 and may be selectively restricted thereby. Additionally, multimedia entertainment content stored on the hard disk drive 60 or other connected storage device may also be transmitted to passenger PEDs 34 via the data communications module 32 and hence regulated by the network access controller 76. In accordance with various embodiments of the system 70, the avionics data is to be limited to the EFBs 54, which share a presence on the local area network 30 with the passenger PEDs 34 as well as terminal units 20. Accordingly, the avionics data is selectively transmitted to the devices on the local area network 30 based upon the security level assigned thereto.

The network access controller 76/firewall 50 may be implemented as a software module/application that is executed by the processor 56. Along these lines, the network access controller 76, along with the avionics bus interface module 72, the avionics sensor interface module 74, and the network interface 78 may similarly be implemented as a software module or application that is executed by the processor 56, and therefore be integrated into a single unit, e.g., the IFEC system 18. These software instructions may be stored in a non-transitory computer readable medium and may perform various methods of regulating data traffic between the computing devices connected to the local area network 30 and the avionics system 52. An exemplary embodiment of these methods will be described with reference to the flowcharts of FIGS. 4A and 4B.

Figure 4A:
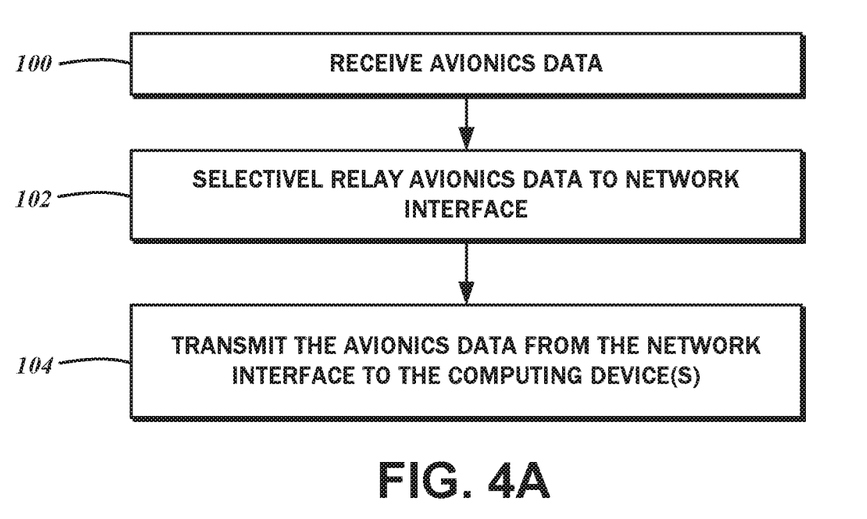
FIGS. 4A and 4B are flowcharts illustrating different aspects of a method of regulating data traffic between computing devices connected to an onboard local area network and aircraft avionics systems that may be embodied as a set of instructions executable by the IFEC computer system.
Figure 4B:
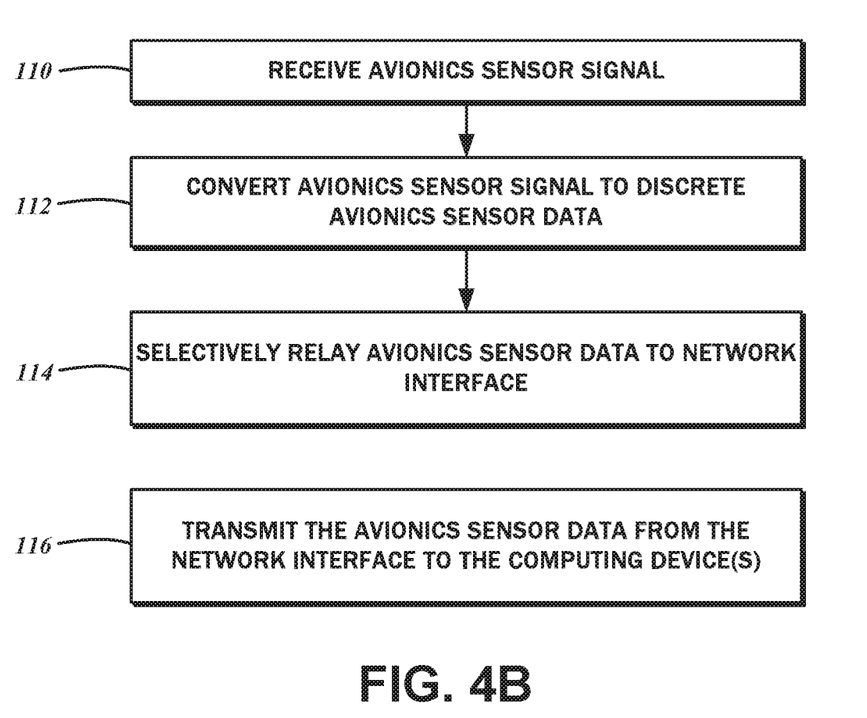

The method begins with a step 100 of receiving the avionics data that is generated by the avionics systems 52, as discussed above. This avionics data is received through a first interface to the avionics data bus 64, e.g., the avionics interface 62 hardware and/or the avionics bus interface module 72. Again, the avionics data is understood to include one or more data elements that each have a security classification.

Thereafter, the method continues with a step 102 of selectively relaying the received avionics data to the network interface 78 of the system 70, as well as the data communications module 32. The destination computing device for the avionics data is understood to be the EFB 54, or other devices that are accessible only by the flight crew. This selective relaying of the avionics data may be based on classifications that are assigned to each data element, or based on the identified source of the data, as the network access controller 76 typically does not discern the nature of, or the security restrictions on, the data from an analysis of its contents.

Then, there is a step 104 of transmitting the avionics data relayed from the network access controller 76 from the network interface 78 to the EFB 54 connected thereto. As discussed above, the network interface 78, together with the data communications module 32, establishes the local area network 30 to which the EFB 54 is connected.

The software also performs additional steps of the method that involve the avionics sensor signals directly received from the discrete sensors 66. Specifically, with reference to the flowchart of FIG. 4B, there is a step 110 of receiving the avionics sensor signal that is generated by the avionics system 52 over the direct connection, as received by the direct sensor interface 68 hardware and the avionics sensor interface module 74. The method continues with a step 112 of converting the avionics sensor signal to the discrete avionics sensor data. It is understood that the avionics sensor data includes one or more data elements that each have a security classification. Next, there is a step 114 of selectively relaying the received avionics sensor data to the network interface 78. This step can be performed by the network access controller 76. The decision of which parts of the data traffic passing through the network interface 78 is allowed to which computing device on the local area network 30 is based upon the security classification of the particular data element. In a step 116, the avionics sensor data relayed from the network access controller 76 is transmitted to the one or more computing devices, e.g., the authorized EFB 54, from the network interface 78.

The particulars shown herein are by way of example only for purposes of illustrative discussion, and are presented in the cause of providing what is believed to be the most useful and readily understood description of the principles and conceptual aspects of the various embodiments of the systems for the conversion of aircraft data over wireless networks for flight deck and cabin airline applications set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A non-transitory computer readable medium connected to an in-flight entertainment and communications (IFEC) system and including instructions executable by the IFEC system for performing a method of regulating data traffic between computing devices connected to an onboard local area network and an aircraft avionics system, the method comprising:
   receiving avionics data generated by the aircraft avionics system through a first interface to an avionics bus, the avionics data including one or more data elements, wherein each data element comprises at least two fields that include a first field with data and a second field with a security classification assigned to the corresponding data;
   receiving sensor signals generated by a plurality of sensors through a direct sensor interface that is configured to quantize an analog signal from at least one of the plurality of sensors, the plurality of sensors including a weight on wheels sensor, a door sensor, an engine start lever sensor, and a brake sensor;
   selectively relaying the avionics data and the sensor signals to a network interface with a network access controller based upon the security classification to which the respective one of the data elements is assigned; and
   transmitting, from the network interface, the avionics data and the sensor signals selectively relayed from the network access controller to one or more of the computing devices, the network interface establishing the onboard local area network separate from the avionics bus, with the one or more of the computing devices being connected to the onboard local area network.

2. The non-transitory computer readable medium of claim 1, wherein the method further includes receiving a message transmitted from the one or more of the computing devices.

3. The non-transitory computer readable medium of claim 2, wherein the method further includes selectively relaying the received message to a remote communications module with the network access controller.

4. The non-transitory computer readable medium of claim 2, wherein the method further includes selectively relaying the received message to the aircraft avionics system with the network access controller over the avionics bus.

5. The non-transitory computer readable medium of claim 2, wherein the received avionics data is structured according to a first communication protocol, the avionics data being encapsulated within a second communication protocol different from the first communication protocol for transmitting to the one or more of the computing devices.

6. The non-transitory computer readable medium of claim 5, wherein the one or more computing devices includes a first interface of the first communication protocol and a second interface of the second communication protocol.

7. The non-transitory computer readable medium of claim 1, wherein one of the one or more computing devices is an electronic flight bag (EFB).

8. A non-transitory computer readable medium connected to an in-flight entertainment and communications (IFEC) system and including instructions executable by the IFEC system for performing a method of regulating data traffic between computing devices connected to an onboard local area network, the method comprising:
   receiving avionics sensor signals generated by a plurality of sensors through a direct sensor interface, wherein the plurality of sensors includes a weight on wheels sensor, a door sensor, an engine start lever sensor, and a brake sensor, and wherein receiving the avionics sensor signals comprises quantizing at least one avionics sensor signal;
   converting the received avionics sensor signals to discrete avionics sensor data, the discrete avionics sensor data including one or more data elements, wherein each data element comprises at least two fields that include a first field with data and a second field with a security classification assigned to the corresponding data;
   selectively relaying the discrete avionics sensor data to a network interface with a network access controller based upon the security classification to which the respective one of the data elements is assigned;
   transmitting, from the network interface, the discrete avionics sensor data selectively relayed from the network access controller to one or more of the computing devices, the network interface establishing the onboard local area network separate from the avionics bus, with the one or more of the computing devices being connected to the onboard local area network.

9. The non-transitory computer readable medium of claim 8, wherein the method further includes receiving a message transmitted from the one or more of the computing devices.

10. The non-transitory computer readable medium of claim 9, wherein the method further includes selectively relaying the received message to a remote communications module with the network access controller.

11. The non-transitory computer readable medium of claim 8, wherein the converted avionics sensor data is structured according to a first communication protocol, the avionics data being encapsulated within a second communication protocol different from the first communication protocol for transmitting to the one or more of the computing devices.

12. The non-transitory computer readable medium of claim 11, wherein the one or more computing devices includes a first interface of the first communication protocol and a second interface of the second communication protocol.

13. The non-transitory computer readable medium of claim 8, wherein one of the one or more computing devices is an electronic flight bag (EFB).

14. A method for regulating data traffic between computing devices connected to an onboard local area network and one or more aircraft avionics systems, the method comprising:
 receiving avionics data from the one or more aircraft avionics systems, the avionics data including one or more data elements, wherein each data element comprises at least two fields that include a first field with data and a second field with a security classification assigned to the corresponding data;
 receiving sensor signals generated by a plurality of sensors through a direct sensor interface that is configured to quantize an analog signal from at least one of the plurality of sensors, the plurality of sensors including a weight on wheels sensor, a door sensor, an engine start lever sensor, and a brake sensor;
 selectively relaying the avionics data and the sensor signals to a network interface with a network access controller based upon the security classification to which the respective one of the data elements is assigned; and
 transmitting, from the network interface, the avionics data and the sensor signals selectively relayed from the network access controller to one or more of the computing devices, the network interface establishing the onboard local area network separate from the avionics bus, with the one or more of the computing devices being connected to the onboard local area network.

15. The method of claim 14, wherein the avionics data is received from the one or more aircraft avionics systems through a first interface to an avionics bus.

16. The method of claim 14, further comprising:
 generating a sensor data object representative of the received avionics sensor signals; and
 assigning the security classification to the sensor data object based upon a predefined association between specific ones of the aircraft avionics system and a corresponding security classification therefor.

17. The method of claim 14, wherein the received avionics data is structured according to a first communication protocol, the avionics data being encapsulated within a second communication protocol different from the first communication protocol for transmitting to the one or more of the computing devices.

18. The method of claim 17, wherein the one or more of the computing devices includes a first interface of the first communication protocol and a second interface of the second communication protocol.

19. The method of claim 14, wherein one of the computing devices is an electronic flight bag (EFB).

* * * * *